(12) United States Patent
Capoldi et al.

(10) Patent No.: US 11,754,122 B2
(45) Date of Patent: Sep. 12, 2023

(54) ROLLING BEARING WITH GUIDING FLANGE FOR CAGE

(71) Applicant: Aktiebolaget SKF, Gothenburg (SE)

(72) Inventors: Bruno Capoldi, Charentenay (FR); Vincent Bredoire, Pourrain (FR); Herve Dondaine, Avallon (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 17/577,523

(22) Filed: Jan. 18, 2022

(65) Prior Publication Data

US 2022/0243763 A1 Aug. 4, 2022

(30) Foreign Application Priority Data

Jan. 29, 2021 (DE) .......................... 102021102133.2

(51) Int. Cl.
*F16C 33/60* (2006.01)
*F16C 19/38* (2006.01)
*F16C 33/46* (2006.01)

(52) U.S. Cl.
CPC .......... *F16C 33/605* (2013.01); *F16C 19/381* (2013.01); *F16C 33/4605* (2013.01); *F16C 2226/60* (2013.01)

(58) Field of Classification Search
CPC .. F16C 19/381; F16C 33/4605; F16C 33/581; F16C 33/585; F16C 33/605; F16C 2226/60; F16C 2300/14; F16C 2360/31; F03D 80/70
See application file for complete search history.

(56) References Cited

U.S. PATENT DOCUMENTS

| 4,422,697 | A | 12/1983 | Gugel |
| 4,861,171 | A * | 8/1989 | Adachi ................. F16C 19/505 384/594 |
| 9,624,977 | B2 | 4/2017 | Terada |
| 2014/0023305 | A1* | 1/2014 | Frank ...................... F16C 25/08 384/569 |
| 2016/0245333 | A1* | 8/2016 | Fiesel ..................... F16C 19/30 |
| 2021/0102575 | A1* | 4/2021 | Altmayer ............ F16C 33/6614 |
| 2021/0156422 | A1* | 5/2021 | Altmayer ................ F16C 19/56 |
| 2022/0243763 | A1 | 8/2022 | Capoldi |

FOREIGN PATENT DOCUMENTS

EP 2851575 B1 5/2016

* cited by examiner

*Primary Examiner* — Alan B Waits
(74) *Attorney, Agent, or Firm* — GARCIA-ZAMOR INTELLECTUAL PROPERTY LAW, LLC; Ruy Garcia-Zamor

(57) ABSTRACT

The bearing includes a first ring, a second ring, at least one row of radial and axial rolling elements arranged between axial and radial raceways provided on the rings. The second ring has a protruding nose engaged into an annular groove of the first ring and provided with the axial raceway and with the radial raceway of the second ring. The bearing further provides at least one cage for maintaining the row of axial rolling elements and at least one flange for guiding and maintaining the cage in radial direction. The flange axially abuts against a flat surface of the second ring. The bearing further includes a plurality of fixing screws to secure the flange to the second ring, the fixing screws extending axially through the flange.

18 Claims, 2 Drawing Sheets

ROLLING BEARING WITH GUIDING FLANGE FOR CAGE

CROSS-REFERENCE TO RELATED APPLICATIONS

Figure 1:
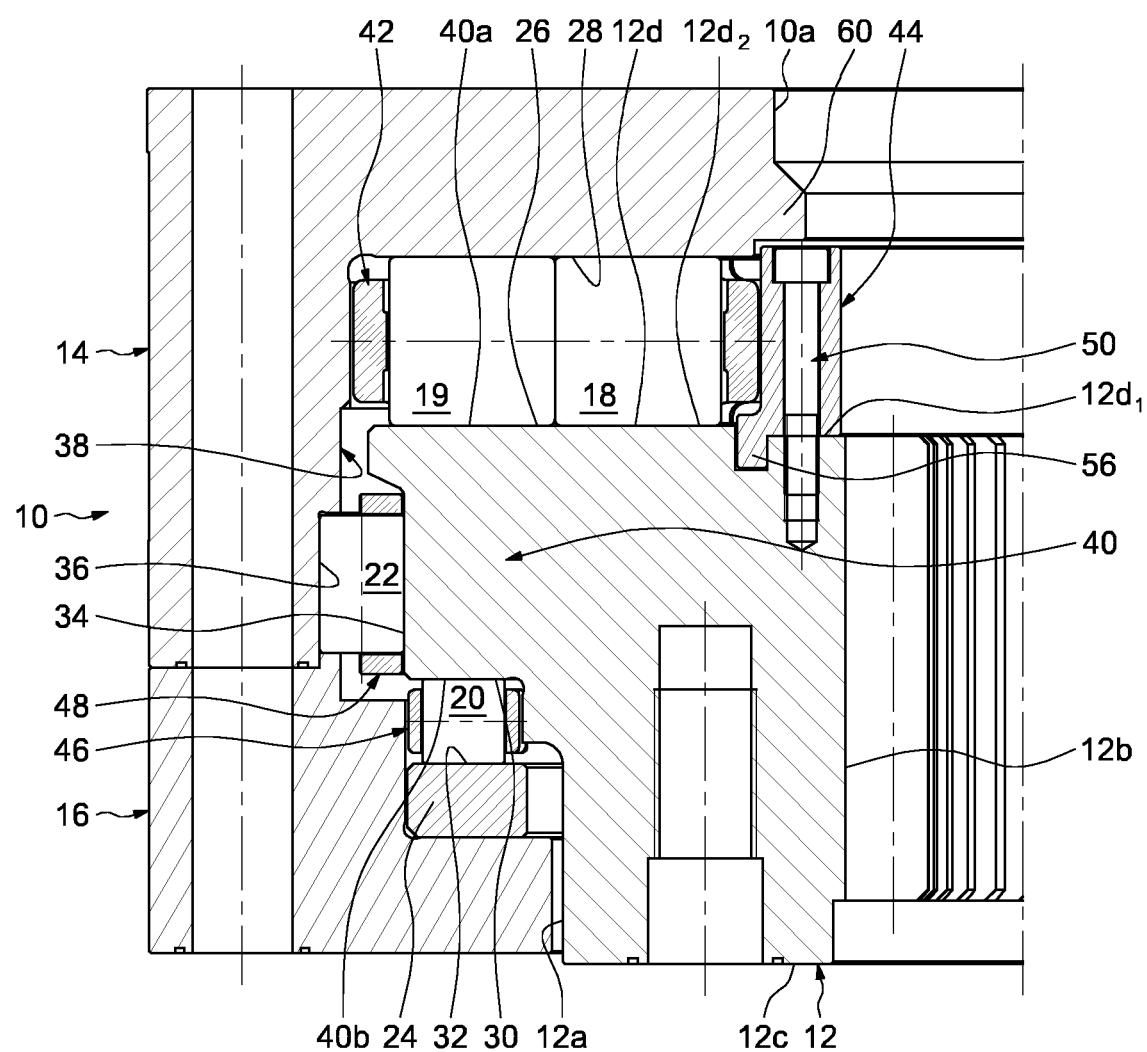

This application claims priority to German Patent Application no. 102021102133.2, filed Jan. 29, 2021, the contents of which is fully incorporated herein by reference.

TECHNICAL FIELD OF THE INVENTION

The present invention relates to the field of rolling bearings. The invention notably relates to the field of large-diameter rolling bearings having an inner ring and an outer ring arranged concentrically about an axis of rotation running in an axial direction.

BACKGROUND OF THE INVENTION

Such large-diameter rolling bearings may be used for example in a tunnel boring machine, in a mining extraction machine or in a wind turbine.

A large-diameter rolling bearing comprises two concentric inner and outer rings, and at least two rows of axial and radial rollers arranged between the rings. The row of axial and radial rollers are arranged between a nose provided on the inner or outer ring which is named "nose ring", and a groove formed on the other ring. The rolling bearing further comprises at least one cage for maintaining the row of axial rollers. For example, it is possible to refer to EP 2851575 B1.

In specific designs, a flange for guiding the cage is secured to the outer or inner ring which delimits the groove. If the inner ring delimits the groove, the flange is radially mounted into contact against the outer cylindrical surface of this inner ring. Alternatively, if the outer ring delimits the groove, the flange is radially mounted against contact into the cylindrical bore of this outer ring.

A plurality of fixing screws is used to secure the flange on the inner or outer ring. The screws are spaced apart in the circumferential direction. Each screw extends radially through the flange and is engaged inside a threaded hole formed on the outer cylindrical surface of the inner ring, or alternatively formed on the cylindrical bore of the outer ring.

In both cases, some of the fixing screws may be broken at the cylindrical interface between the flange and the inner or outer ring during operation when the rolling is subjected to vibrations. The broken parts of the screws may fall into the gearing system of the associated machine with important damages.

One aim of the present invention is to overcome this drawback.

SUMMARY OF THE INVENTION

The invention relates to a rolling bearing comprising a first ring, a second ring, at least one row of radial rolling elements arranged between axial raceways provided on the rings, and at least one row of axial rolling elements arranged between radial raceways provided on the rings.

The terms "axial rolling elements" is understood to mean rolling elements adapted to accommodate axial loads. The terms "radial rolling elements" is understood to mean rolling elements adapted to accommodate radial loads.

The second ring comprises a protruding nose engaged into an annular groove of the first ring. The nose is provided with the axial raceway and with the radial raceway of the second ring.

The rolling bearing also comprises at least one cage for maintaining the row of axial rolling elements. The rolling bearing further comprises at least one flange for guiding and maintaining the cage in radial direction.

According to a first general feature, the flange axially abuts against a flat surface of the second ring.

According to a second general feature, the rolling bearing further comprises a plurality of fixing screws to secure the flange to the second ring.

According to a third general feature, the fixing screws extend axially through the flange.

With such design, the risk of screw breaking is highly reduced due to the flat contact surface between the guiding flange and the frontal face of the second ring. There is no gap between the guiding flange and the second ring.

The groove may be provided with the axial raceway and with the radial raceway of the first ring.

Each fixing screw may be engaged inside a threaded hole extending axially from the flat surface of the second ring.

Preferably, the flat surface of the second ring extends radially. Alternatively, the flat surface of the second ring may have other shape. For example, the flat surface of the second ring may extend obliquely.

In one embodiment, the second ring is provided with opposite frontal faces which axially delimit the axial thickness of the second ring, the flat surface of the second ring of the first ring onto which axially abuts the flange being formed on one of these frontal faces.

The frontal face of the second ring may have a stepped shape and may be provided with a first surface and with a second surface which is axially offset outwards with respect to the first surface, the flat surface of the second ring onto which axially abuts the flange being formed by the first surface.

Alternatively, the frontal face of the second ring may extend in one single radial plane.

In one advantageous embodiment, the flange comprises at least one heel engaged into one groove of the second ring. This limits the shearing effect in radial direction and improves the lifetime of the bearing.

The heel of the flange may have an annular form. Alternatively, the flange may comprise a plurality of heels spaced apart in the circumferential direction, preferably regularly.

The groove may extend axially from the flat surface of the second ring. The groove may have an annular form.

In another embodiment, the flange may not be provided with the heel.

Advantageously, the first ring comprises at least one retaining shoulder which axially faces at least partly the flange and the fixing screws, and which is axially located on the side opposite to the second ring with regard to the row of axial rolling elements.

The shoulder enables to retain and block the screws inside the flange if the vibrations applied to the rolling bearing detach or break these screws initially secured to the second ring.

To this end, the size of an axial gap, which is provided between the flange and the retaining shoulder of the first ring, is preferably smaller than the length of each fixing screw which protrudes axially with respect to the flat surface of the second ring in contact with the flange.

The shoulder of the first ring may have an annular form.

Alternatively, the first ring may comprise a plurality of retaining shoulders spaced apart in the circumferential direction, each shoulder facing one of the fixing screws.

In one embodiment, the first ring may comprise at least a supporting ring and a retaining ring stacked one relative to the other in the axial direction, the radial raceway of the first ring being provided on the supporting ring. In this case, the supporting ring may be provided with the retaining shoulder.

In another embodiment, the first ring may not be provided with the shoulder.

In one embodiment, the rolling bearing comprises at least two rows of axial rolling elements being disposed axially on both sides of the nose of the second ring.

In one embodiment, the first ring is the outer ring and the second ring is the inner ring. Alternatively, the first ring may be the inner ring and the second ring may be the outer ring.

BRIEF DESCRIPTION OF THE INVENTION

Figure 2:
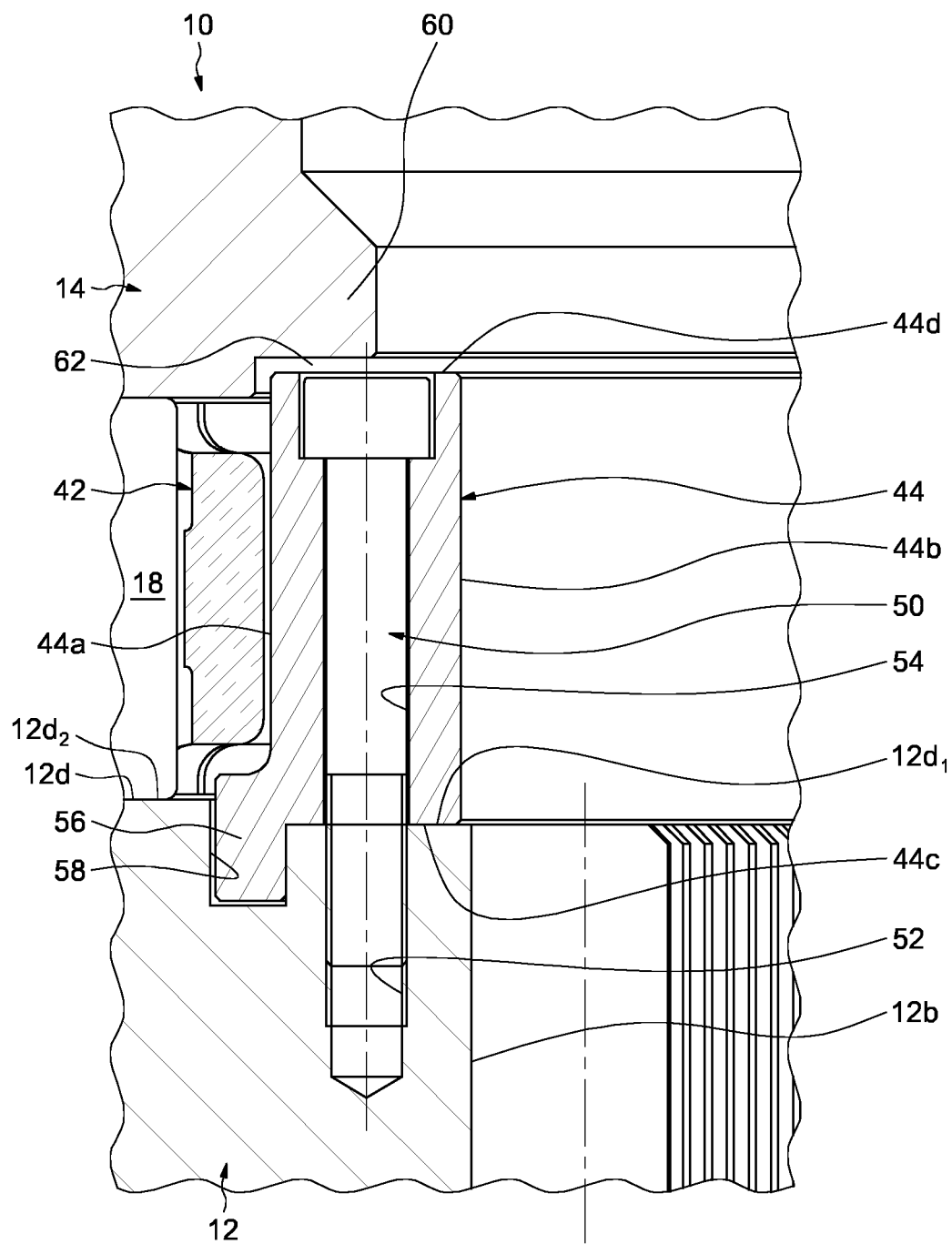

The present invention and its advantages will be better understood by studying the detailed description of a specific embodiment given by way of a non-limiting example and illustrated by the appended drawings on which:

FIG. 1 is a partial cross-section of a rolling bearing according to a first example of the invention, and FIG. 2 is a detail view of FIG. 1.

DETAILED DESCRIPTION OF THE INVENTION

The rolling bearing as illustrated on FIG. 1 is a large-diameter rolling bearing comprising a first ring 10 and a second ring 12. In the illustrated example, the first ring 10 is the outer ring whereas the second ring 12 is the inner ring. In this example, the inner ring 12 is a rotative ring and the outer ring 10 is a non-rotative ring. The rolling bearing may for example be used in a tunnel boring machine, a wind turbine or any other applications using a large diameter rolling bearing.

The outer and inner rings 10, 12 are concentric and extend axially along the bearing rotation axis (not shown) which runs in an axial direction. In the illustrated example, the rings 10, 12 are of the solid type.

The outer ring 10 is formed as a split ring and comprises a first supporting ring 14 and a second retaining ring 16 stacked one relative to the other in the axial direction. Each of the supporting and retaining rings 14, 16 of the outer ring is provided with a plurality of aligned through-holes (not referenced) in order to be joined by fitting bolts.

In the illustrated example, the rolling bearing comprises three rows of axial rollers 18, 19, 20 which are arranged between the outer and inner rings 10, 12 in order to form an axial thrust, and a row of radial rollers 22 which are arranged between the rings to form a radial thrust.

In the illustrated example, the rolling bearing also comprises a thrust ring 24 axially mounted between the row of axial rollers 20 and the outer ring 10. Such a thrust ring 24 may be named "elastic ring". The thrust ring 24 is axially interposed between the row of axial rollers 20 and the retaining ring 16 of the outer ring. The rolling bearing further comprises a plurality of spring systems (not shown) to axially push the thrust ring 24 against the axial rollers 20. The spring systems 42 are mounted on the retaining ring 16 of the outer ring. Alternatively, the rolling bearing may be deprived of such thrust ring 24 and spring systems.

The rollers 18, 19, 20, 22 of one row are identical to one another. Each roller 18, 19, 20, 22 comprises a cylindrical outer rolling surface. The axis of rotation of each roller 22 is parallel to the axis of the bearing and perpendicular to the axes of each of the rollers 18, 19, 20. In the illustrated example, the row of rollers 18 is superimposed on the row of rollers 19. Alternatively, the two rows of rollers 18, 19 may be replaced by one row of rollers.

The rollers 18, 19 are arranged axially between annular radial raceways 26, 28 respectively formed on the inner and outer rings 12, 10. The radial raceway 28 is formed on the supporting ring 14 of the outer ring. The raceways 26, 28 face each other in the axial direction.

The rollers 20 are arranged axially between annular radial raceways 30, 32 respectively formed on the inner ring 12 and the thrust ring 24. The raceways 30, 32 axially face each other. The rows of rollers 18, 19 and the row of rollers 20 are spaced apart from each other in the axial direction.

The rollers 22 are arranged radially between annular axial raceways 34, 36 respectively formed on the inner and outer rings 12, 10. The radial raceway 36 is formed on the supporting ring 14 of the outer ring. The raceways 34, 36 face each other in the radial direction. The row of rollers 22 is radially offset outwards with respect to the rows of rollers 18, 19, 20. The row of rollers 22 is axially located between the rows of rollers 18, 19, 20.

The outer ring 10 comprises an annular groove 38 opening in a radial direction inwardly towards the inner ring 12. The outer ring 10 comprises an inner stepped cylindrical surface or bore 10a from which the groove 38 is formed.

The inner ring 12 comprises an annular protruding nose 40 engaging into the annular groove 38 of the outer ring. The nose 40 extends radially outwards. The nose 40 protrudes radially from an outer cylindrical surface 12a of the inner ring.

The inner ring 12 also comprises an inner cylindrical bore 12b which is radially opposite to the outer cylindrical surface 12a. In the illustrated example, the bore 12a of the inner ring is provided with a gear teeth (not referenced). The inner ring 12 further comprises two opposite radial frontal faces 12c, 12d which axially delimit the outer cylindrical surface 12a and the bore 12b. The frontal faces 12c, 12d delimits the axial thickness of the inner ring. As will be described later, the frontal face 12d has a stepped shape.

The rows of rollers 18, 19, 20 are arranged axially between the nose 40 of the inner ring and the groove 38 of the outer ring. The rows of rollers 18, 19 are disposed on one side of the nose 40, and the row of rollers 20 is disposed on the other side.

The radial raceway 26 is located on the nose 40. A first radial flank 40a of the nose delimits the radial raceway 26. A second opposite radial flank 40b of the nose delimits the radial raceway 30. The opposite first and second flanks 40a, 40b of the nose delimit axially the nose. The radial raceway 28 is located on the groove 38 of the outer ring. The radial raceway 32 is located on the thrust ring 24.

The row of rollers 22 is arranged radially between the nose 40 of the inner ring and the groove 38 of the outer ring. The axial raceways 34, 36 are respectively located on the nose 40 and the groove 38. An outer cylindrical surface of the nose 40 delimits the axial raceway 34. An axial bottom of the groove 38 delimits the axial raceway 36. The axial raceway 36 radially faces the outer cylindrical surface of the nose 40 onto which is formed the axial raceway 34. The outer cylindrical surface of the nose 40 and the outer cylindrical surface 12b are radially offset. As a result, the axial raceway 34 and the outer cylindrical surface 12b are also radially offset. The outer cylindrical surface of the nose 40 extends axially between the opposite radial flanks 40a, 40b of the nose.

In the illustrated example, the inner ring 12 is made in one part. Alternatively, the inner ring 12 may be divided in the axial direction in at least two separate parts secured together. In another variant, the nose 40 may be made separately from the main part of the inner ring.

As previously mentioned, the outer ring 10 is divided in the axial direction in two separate parts, the supporting ring 14 and the retaining ring 16. The supporting and retaining rings 14, 16 delimit together the groove 38.

The rolling bearing further comprises a cage 42 for maintaining the axial rollers 18, 19 spaced apart in the circumferential direction. As will be described later, the rolling bearing also comprises an annular flange 44 for guiding and maintaining the cage 42 in the radial direction.

The cage 42 maintains a regular circumferential spacing between the axial rollers 18, 19. The cage 42 is housed inside the annular space defined axially between the inner ring 12 and the outer ring, and defined radially between the outer ring and the flange 44. Each axial roller 18, 19 is maintained by the cage 42.

The cage 42 delimits a plurality of pockets each configured to receive one axial roller 18 and one axial roller 19. As previously mentioned, in the illustrated example, the rolling bearing comprises the two rows of superimposed rollers 18, 19. Alternatively, the rolling bearing may comprise only one row of rollers arranged between the raceways 26, 28. In this case, each pocket of the cage receives only one axial roller.

The cage 42 may be segmented in the circumferential direction and formed by a plurality of successive cage segments. The cage 42 may be made for example from metal such as steel, brass or from plastic material.

Similarly, the rolling bearing further comprises cages 46, 48 for respectively maintaining the rollers 20, 22 spaced apart in the circumferential direction.

As previously mentioned, the flange 44 is provided for guiding the cage 42 but also for maintaining the cage in the radial direction. The flange 44 is secured to the inner ring 12. The flange 44 extends perpendicularly to the raceways 26, 28 of the inner and outer rings.

In the illustrated example, the flange 44 is radially offset inwards with regard to the cage 42. A slight radial gap (not referenced) is provided between the cage 42 and the flange 44. The cage 42 is mounted around the flange 44. The cage 42 is freely movable in rotation with regard to the flange 44.

The flange 44 axially abuts against the frontal face 12d of the inner ring. As previously mentioned, in the illustrated example, the frontal face 12d has a stepped shape. The frontal face 12d is provided with a flat radial first surface $12d_1$ onto which axially abuts the flange 44, and with a flat radial second surface $12d_2$ which is axially offset outwards with respect to the first surface. An axial wall extends between the first and second surfaces 12d1, 12d2 of the frontal face 12d. Alternatively, it could be possible to provide the inner ring with an entire flat frontal face 12d extending in one single radial plane of the rolling bearing.

The rolling bearing comprises a plurality of fixing screws 50 to secure the flange 44 to the inner ring 12. The screws 50 are spaced apart in the circumferential direction, preferably regularly. The screws 50 extend axially through the flange 44.

As shown more clearly on FIG. 2, each screw 50 is engaged inside a threaded hole 52 of the inner ring 12. Each threaded hole 52 extends axially from the flat first surface $12d_1$ of the frontal face 12d of the inner ring. Each screw 50 extends axially inside a through-hole 54 made into the flange 44. Accordingly, the flange 44 comprises a plurality of through-holes 54 spaced apart in the circumferential direction. Each through-hole 54 extends axially. The head of each screw 50 axially abuts against the flange 44.

The flange 44 is provided with an annular heel 56 engaged inside an annular groove 58 formed on the flat first surface 12d1 of the frontal face 12d of the inner ring. The groove 58 extends axially from the flat first surface $12d_1$. The groove 58 opens axially outwards. The heel 56 radially abuts against a wall of the groove 58 which radially delimits the groove.

The flange 44 comprises an outer cylindrical surface 44a which form a guiding surface onto which may bear the cage 42. The flange 44 also comprises an inner cylindrical bore 44b which is radially opposite to the outer cylindrical surface 44a. The flange 44 further comprises two opposite radial frontal faces 44c, 44d which axially delimit the outer surface 44a and the bore 44b. The frontal faces 44c, 44d delimit the axial thickness of the outer flange 44.

The frontal face 44c of the flange, which is flat, axially abuts against the flat first surface 12d1 of the frontal face 12d of the inner ring. The heel 56 axially protrudes with regard to the frontal face 44c of the flange. The heel 56 also protrudes radially outwards with regard to the outer surface 44a of the flange.

Each through-hole 54 opens on the frontal face 44c and on the frontal face 44d of the flange. In the illustrated example, each screw 50 is housed inside the flange 44. Alternatively, the screw 50 may slightly protrude axially with respect to the frontal face 44d the flange.

The flange 44 has an annular form. The flange 44 forms a sleeve. The flange 44 may be made in one part. Alternatively, the flange 44 may be segmented in the circumferential direction. The flange 44 may be made for example from metal such as steel, brass or from plastic material.

In the illustrated example, the outer ring 10 comprises an annular shoulder 60 extending radially inwards and facing partly the flange 44 in the axial direction. The shoulder 60 extends the bore of the outer ring. The supporting ring 14 of the outer ring comprises the shoulder 60. Here, the shoulder 60 and the supporting ring 14 are made in one part.

The shoulder 60 is axially located on the side opposite to the inner ring 12 with regard to the rollers 18. The shoulder 60 axially faces partly the frontal face 44d of the flange. The shoulder 60 axially faces partly each screw 50. More precisely, the shoulder 60 axially faces partly the head of each screw 50. A small axial gap 62 is here provided between the flange 44 and the shoulder 60.

The shoulder 60 enables to retain and block one or several screws 50 inside the flange 44 if the vibrations applied to the rolling bearing detach or break these screws. In the illustrated example, the axial gap 62 is small, for example less than 1 cm. Alternatively, it is possible to provide a larger axial gap while maintaining the size of this gap smaller than the length of the screws 50 which protrudes axially with respect to the flat first surface $12d_1$ of the frontal face 12d of the inner ring.

Otherwise, as previously mentioned, in this example, the first ring of the rolling bearing is the fixed outer ring 10 whereas the second ring is the rotative inner ring 12.

As an alternative, it could be possible to provide a reversed arrangement with the first ring forming the fixed inner ring and the second ring forming the rotative outer ring.

In this case, the outer ring is provided with the protruding nose 40 which extends radially inward. The groove 38 is formed on the inner ring and opens radially outwards. The nose 40 engages into the groove 38. In such embodiment, the guiding flange 44 is secured to the outer ring. The flange is radially offset outwards with regard to the cage 42. The flange is mounted around the cage 42. The bore of the flange forms the guiding surface onto which may bear the cage 42. The flange is secured to the outer ring as previously described for the illustrated example. With such reversed arrangement, if the rolling bearing is provided with the retaining shoulder 60, this shoulder is provided on the supporting ring 14 of the inner ring.

In the described examples, the rolling bearing is provided with four rows of rolling elements. Alternatively, the rolling bearing may comprise only two rows of rolling elements, or three rows of rolling elements, or five or more rows of rolling elements. In the illustrated example, the rolling elements are rollers. The rolling bearing may comprise other types of rolling elements, for example balls.

The invention claimed is:

1. A rolling bearing comprising:
   a first ring,
   a second ring defining a groove in a flat surface thereon, the groove extending axially,
   a row of radial rolling elements arranged between axial raceways provided on the rings,
   a first row of axial rolling elements arranged between first radial raceways provided on the rings, the second ring comprising a protruding nose engaged into an annular groove of the first ring and provided with the axial raceway and with the first radial raceway of the second ring,
   a cage for maintaining the first row of axial rolling elements
   a flange for guiding and maintaining the cage in radial direction, and
   a second row of axial rolling elements arranged between second radial raceways provided on the second ring and a thrust ring located on the first ring, the thrust ring axially pushing against the second row of axial rolling elements, wherein
   the flange axially abuts against the flat surface of the second ring, the flange having a heel which extends axially therefrom such that the flange contacts the flat surface while the heel is in the groove, the flange defining an axially extending outer radial surface and an axially extending inner radial surface, the axially extending radial outer surface being configured to abut the cage, the axially extending radial inner surface defining a portion of a cylindrical bore of the rolling bearing, and
   a plurality of fixing screws secure the flange to the second ring, the fixing screws extending axially through the flange.

2. The rolling bearing according to claim 1, wherein each of the plurality of fixing screws is engaged inside a separate threaded hole extending axially from the flat surface of the second ring.

3. The rolling bearing according to claim 1, wherein the flat surface of the second ring extends radially.

4. The rolling bearing according to claim 1, wherein the second ring is provided with opposite frontal faces which axially delimit the axial thickness of the second ring, the flat surface of the second ring being formed on one of the opposite frontal faces.

5. The rolling bearing according to claim 1, wherein the first ring comprises a retaining shoulder which axially faces at least partly the flange and the plurality of fixing screws, the retaining shoulder being axially located on an opposite side of the row of axial rolling elements from the heel of the flange.

6. The rolling bearing according to claim 1, wherein the first ring comprises at least a supporting ring and a retaining ring stacked one relative to the other in the axial direction, the radial raceway of the first ring being provided on the supporting ring.

7. A rolling bearing comprising:
   a first ring,
   a second ring,
   at least one row of radial rolling elements arranged between axial raceways provided on the rings,
   at least one row of axial rolling elements arranged between radial raceways provided on the rings, the second ring comprising a protruding nose engaged into an annular groove of the first ring and provided with the axial raceway and with the radial raceway of the second ring, and
   at least one cage for maintaining the row of axial rolling elements and at least one flange for guiding and maintaining the cage in radial direction,
   wherein the flange axially abuts against a flat surface of the second ring,
   wherein a plurality of fixing screws secure the flange to the second ring, the fixing screws extending axially through the flange,
   wherein the first ring further comprises at least one retaining shoulder which axially faces at least partly the flange and the fixing screws, the retaining shoulder being axially located on the side opposite to the second ring with regard to the row of axial rolling elements, and
   wherein the size of an axial gap, which is provided between the flange and the retaining shoulder of the first ring, is less than the length of each fixing screw which protrudes axially with respect to the flat surface of the second ring.

8. The rolling bearing according to claim 7, wherein each fixing screw is engaged inside a threaded hole extending axially from the flat surface of the second ring.

9. The rolling bearing according to claim 7, wherein the flat surface of the second ring extends radially.

10. The rolling bearing according to claim 7, wherein the second ring is provided with opposite frontal faces which axially delimit the axial thickness of the second ring, the flat surface of the second ring onto which axially abuts the flange being formed on one of these frontal faces.

11. The rolling bearing according to claim 7, wherein the flange comprises at least one heel engaged into one groove of the second ring.

12. A rolling bearing comprising:
   a first ring,
   a second ring,
   at least one row of radial rolling elements arranged between axial raceways provided on the rings,
   at least one row of axial rolling elements arranged between radial raceways provided on the rings, the second ring comprising a protruding nose engaged into an annular groove of the first ring and provided with the axial raceway and with the radial raceway of the second ring, and
   at least one cage for maintaining the row of axial rolling elements and at least one flange for guiding and maintaining the cage in radial direction,
   wherein the flange axially abuts against a flat surface of the second ring, wherein a plurality of fixing screws secure the flange to the second ring, the fixing screws extending axially through the flange, wherein the first ring comprises at least a supporting ring and a retaining ring stacked one relative to the other in the axial direction, the radial raceway of the first ring being provided on the supporting ring, and wherein the first ring comprises at least one retaining shoulder which axially faces at least partly the flange and the fixing screws, the retaining shoulder being axially located on the side opposite to the second ring with regard to the row of axial rolling elements, and wherein the supporting ring is provided with the retaining shoulder.

13. The rolling bearing according to claim 12, wherein each fixing screw is engaged inside a threaded hole extending axially from the flat surface of the second ring.

14. The rolling bearing according to claim 12, wherein the flat surface of the second ring extends radially.

15. The rolling bearing according to claim 12, wherein the second ring is provided with opposite frontal faces which axially delimit the axial thickness of the second ring, the flat surface of the second ring onto which axially abuts the flange being formed on one of these frontal faces.

16. The rolling bearing according to claim 12, wherein the flange comprises at least one heel engaged into one groove of the second ring.

17. A rolling bearing comprising:

a first ring, a second ring having a flat surface, a row of radial rolling elements arranged between axial raceways provided on the rings, a first row of axial rolling elements arranged between first radial raceways provided on the rings, the second ring comprising a protruding nose engaged into an annular groove of the first ring and provided with the axial raceway and with the first radial raceway of the second ring, a cage for maintaining the first row of axial rolling elements a flange for guiding and maintaining the cage in radial direction, and a second row of axial rolling elements arranged between second radial raceways provided on the second ring and a thrust ring located on the first ring, the thrust ring axially pushing against the second row of axial rolling elements, the flange axially abuts against the flat surface of the second ring, a plurality of fixing screws secure the flange to the second ring, the fixing screws extending axially through the flange, wherein the first ring comprises a retaining shoulder which axially faces at least partly the flange and the plurality of fixing screws, the retaining shoulder being axially located on an opposite side of the row of axial rolling elements from the heel of the flange, and wherein the size of an axial gap, which is provided between the flange and the retaining shoulder of the first ring, is less than the length of each fixing screw which protrudes axially with respect to the flat surface of the second ring.

18. A rolling bearing comprising:

a first ring, a second ring having a flat surface, a row of radial rolling elements arranged between axial raceways provided on the rings, a first row of axial rolling elements arranged between first radial raceways provided on the rings, the second ring comprising a protruding nose engaged into an annular groove of the first ring and provided with the axial raceway and with the first radial raceway of the second ring, a cage for maintaining the first row of axial rolling elements a flange for guiding and maintaining the cage in radial direction, and a second row of axial rolling elements arranged between second radial raceways provided on the second ring and a thrust ring located on the first ring, the thrust ring axially pushing against the second row of axial rolling elements, the flange axially abuts against the flat surface of the second ring, a plurality of fixing screws secure the flange to the second ring, the fixing screws extending axially through the flange, wherein the first ring comprises at least a supporting ring and a retaining ring stacked one relative to the other in the axial direction, the radial raceway of the first ring being provided on the supporting ring, and wherein the first ring comprises at least one retaining shoulder which axially faces at least partly the flange and the fixing screws, the retaining shoulder being axially located on the side opposite to the second ring with regard to the row of axial rolling elements, and wherein the supporting ring is provided with the retaining shoulder.

* * * * *